United States Patent [19]
Sparks et al.

[11] Patent Number: 5,609,362
[45] Date of Patent: Mar. 11, 1997

[54] INFLATOR

[75] Inventors: Tracy S. Sparks, Lapeer; Ernst M. Faigle, Dryden, both of Mich.

[73] Assignee: TRW Vehicle Safety Systems Inc., Lyndhurst, Ohio

[21] Appl. No.: 635,366

[22] Filed: Apr. 19, 1996

[51] Int. Cl.⁶ ................................................ B60R 21/26
[52] U.S. Cl. ........................ 280/741; 280/736; 280/737
[58] Field of Search ................................. 280/741, 736, 280/737; 102/530, 531; 222/3; 422/164, 165

[56] References Cited

U.S. PATENT DOCUMENTS

| Re. 28,164 | 9/1974 | Stephenson | 280/736 |
|---|---|---|---|
| 3,788,667 | 1/1974 | Vancil | 280/736 |
| 3,882,673 | 5/1975 | Doin et al. | 280/741 X |
| 3,895,821 | 7/1975 | Schothoefer et al. | 280/741 |
| 3,930,666 | 1/1976 | Lynch et al. | 280/737 |
| 3,966,226 | 6/1976 | Roth | 280/737 |
| 4,114,924 | 9/1978 | Kasagi et al. | 280/740 |
| 4,370,930 | 2/1983 | Strasser et al. | 102/530 |
| 4,734,265 | 3/1988 | Nilsson et al. | 422/165 |
| 5,031,932 | 7/1991 | Frantom et al. | 280/741 |
| 5,033,772 | 7/1991 | Frantom et al. | 280/741 |
| 5,078,422 | 1/1992 | Hamilton et al. | 280/736 |
| 5,280,951 | 1/1994 | Rizzi et al. | 280/736 |
| 5,462,307 | 10/1995 | Webber et al. | 290/737 |
| 5,464,247 | 11/1995 | Rizzi et al. | 280/736 |
| 5,518,144 | 5/1996 | Headley et al. | 280/737 X |

*Primary Examiner*—Christopher P. Ellis
*Attorney, Agent, or Firm*—Tarolli, Sundheim, Covell, Tummino & Szabo

[57] ABSTRACT

An inflator (12) for inflating an inflatable vehicle occupant protection device (36) includes a vessel (14) having a chamber (16) which holds fluid under pressure. An opening (20) to the chamber (16) is defined by an inner side surface (66, 76) of the vessel (14). A plug (18) is disposed in the opening (20) to the chamber (16) to block the opening. A passage (42) is formed in the plug (18) to direct fluid from the chamber (16) to the inflatable device (36). The plug (18) is welded to the inner side surface (66, 76) of the vessel (14) to retain the plug (18) in the vessel (14) and form a fluid tight seal between the plug (18) and the vessel (14). Preferably, a rim portion (84) of the vessel (14) is disposed outward of the weld and extends over a portion (104) of the plug (18) to help in retaining the plug (18) in the vessel. Also the side surface (66, 76) of the vessel (14) preferably tapers radially inward in a direction towards the chamber in the vessel. The plug (18) has a tapered outer side surface (90) which sealingly engages with the inner side surface (66, 76) of the vessel (14).

20 Claims, 2 Drawing Sheets

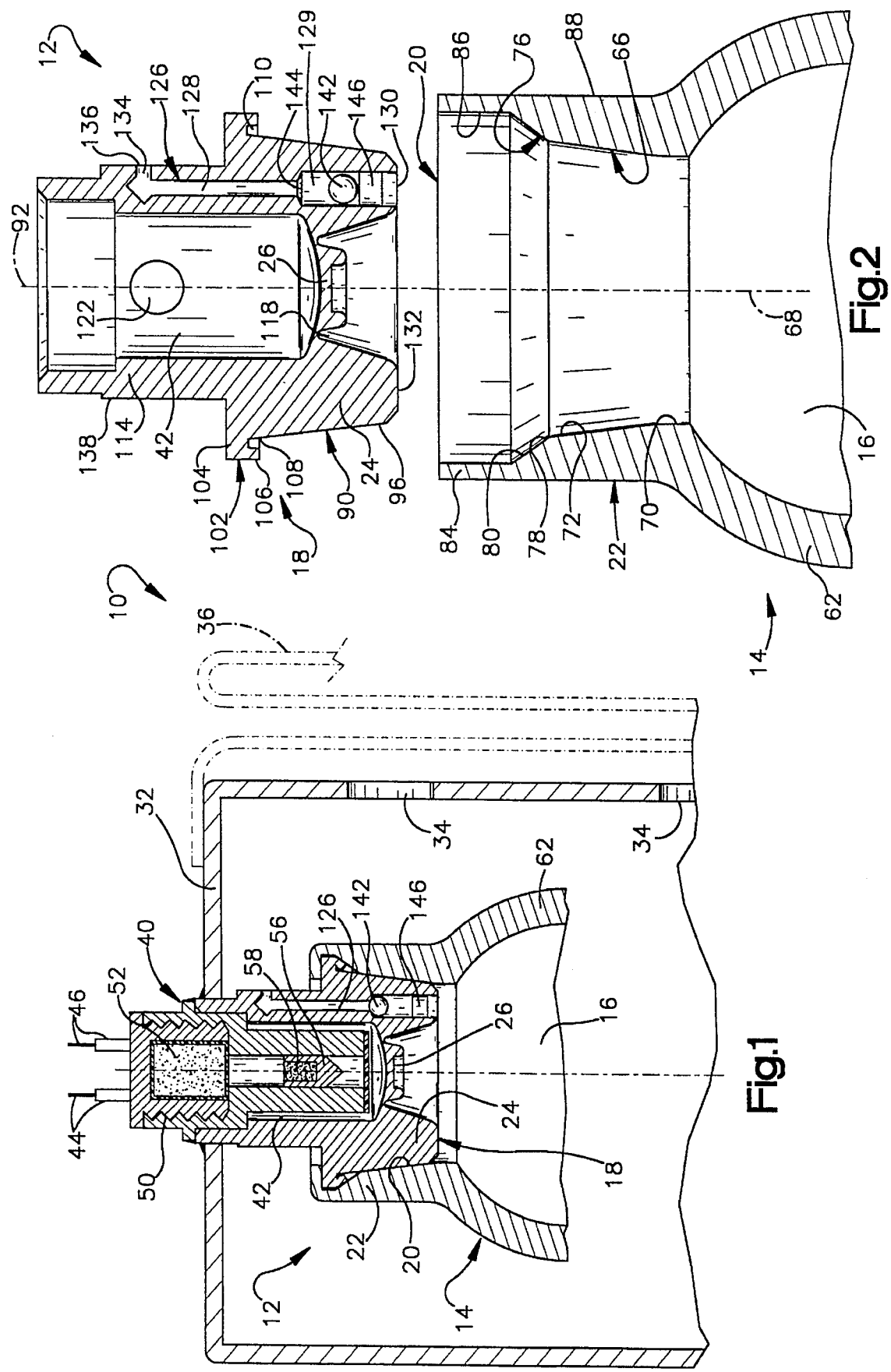

5,609,362

INFLATOR

BACKGROUND OF THE INVENTION

The present invention relates to a vehicle occupant safety apparatus and more specifically to an inflator for providing inflation fluid to inflate an inflatable vehicle occupant protection device, such as an air bag.

A known inflator for providing inflation fluid for inflating an air bag includes a vessel which holds a combustible mixture of gases under pressure. Upon the occurrence of vehicle deceleration which is indicative of a vehicle collision with a severity above a predetermined threshold and for which inflation of the air bag is desired, an actuator assembly is activated to ignite the mixture of combustible gases. The gases flow from the vessel into the air bag to inflate the air bag. The inflated air bag helps restrain movement of an occupant of the vehicle and thereby helps to protect the occupant of the vehicle from forcibly striking parts of the vehicle.

SUMMARY OF THE INVENTION

An inflator for inflating an inflatable vehicle occupant protection device in accordance with the present invention includes a vessel having a chamber which holds fluid under pressure to inflate the inflatable device. The vessel has an inner surface at least partially defining an opening to the chamber. A plug is disposed in the opening to the chamber. The plug has a passage for directing fluid from the chamber to the inflatable device. A weld is located between the plug and the inner surface of the vessel to retain the plug in the vessel and provide a fluid tight seal between the plug and the vessel. The vessel also has a rim which is disposed outward of the weld and extends over a portion of the plug to retain the plug in the vessel opening.

The plug has a flange which engages a portion of the inner surface of the vessel. The weld is formed between the flange on the plug and the portion of the inner surface of the vessel.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a fragmentary sectional view of a vehicle occupant safety apparatus having an inflator constructed in accordance with the present invention;

FIG. 2 is an enlarged fragmentary view illustrating the relationship between a vessel and a plug of the inflator prior to connection of the plug with the vessel.

DESCRIPTION OF ONE SPECIFIC PREFERRED EMBODIMENT OF THE INVENTION

Figure 3:
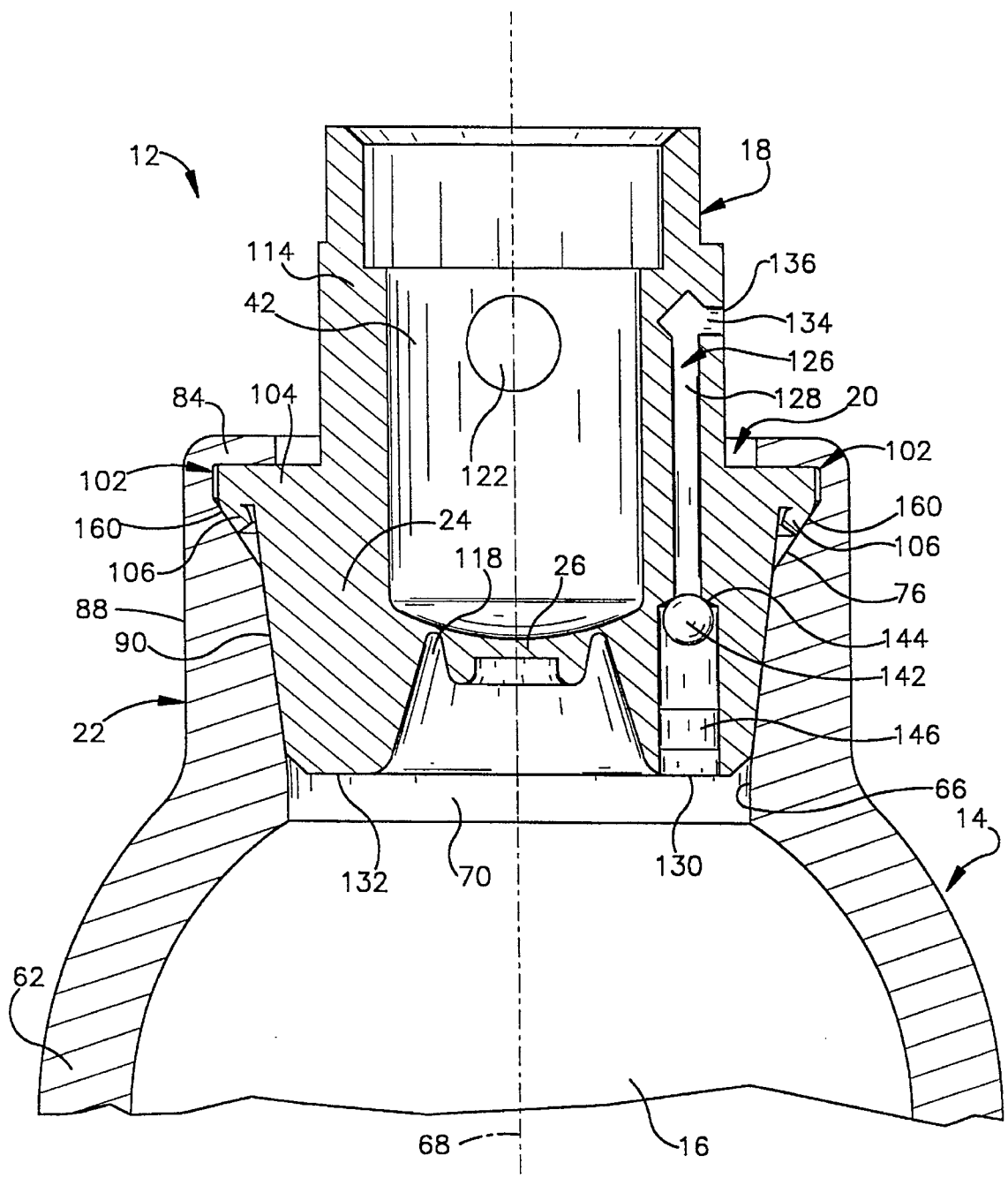
FIG. 3 is an enlarged fragmentary sectional view illustrating the relationship between the plug and the vessel after the plug has been connected with the vessel.

A vehicle occupant safety apparatus 10 is illustrated in FIG. 1. The vehicle occupant safety apparatus 10 includes an inflator 12. The inflator 12 (FIG. 1) is disposed in a canister or housing 32. The canister 32 has openings 34 communicating with an inflatable vehicle occupant protection device 36 of the type which is commonly referred to as an air bag. The air bag 36 is connected with the canister 32 in any suitable manner. The inflatable device could alternatively comprise an inflatable seat belt, an inflatable knee bolster, an inflatable head liner, or a knee bolster operated by an inflatable bag.

The inflator 12 includes a metal vessel 14 having a generally cylindrical chamber 16 which holds fluid under pressure. In the illustrated embodiment of the vehicle occupant safety apparatus 10, the chamber 16 holds a combustible mixture of gases including a fuel gas, such as hydrogen, an oxidizer gas, such as oxygen, and an inert gas, such as nitrogen.

The vessel 14 (FIG. 2) includes a cylindrical side wall 62 which is formed as one piece with a neck portion 22 of the vessel 14. An opening 20 to the chamber 16 in the vessel 14 is formed in the neck portion 22 of the vessel. The vessel 14 has a smooth axially tapering first inner side surface 66 defining a portion of the opening 20.

The first inner side surface 66 tapers radially inward as it extends in a direction toward the chamber 16 in the vessel 14. The first inner side surface 66 is a portion of a right circular cone and has a central axis which is coincident with a central axis 68 of the vessel 14. Thus, an axially inner end portion 70 of the first inner side surface 66 has a relatively small diameter and an axially outer end portion 72 has a relatively large diameter.

The vessel 14 also has a smooth axially tapering second inner side surface 76 defining a portion of the opening 20 (FIG. 2) to the chamber 16. The second inner side surface 76 is disposed axially outward of the first inner side surface 66 and tapers radially inward as it extends in a direction toward the first inner side surface 66 and the chamber 16.

The second inner side surface 76 is formed as a portion of a right circular cone and has a central axis which is coincident with the central axis 68 of the vessel 14. A relatively small diameter axially inner end portion 78 of the second inner side surface 76 abuts the large diameter outer end portion 72 of the first inner side surface 66. In addition, the second inner side surface 76 has a relatively large diameter axially outer end portion 80.

The small diameter axially inner end portion 78 of the second inner side surface 76 has a diameter which is greater than the diameter of the axially inner end portion 70 of the first inner side surface 66. The small diameter axially inner end portion 78 of the second inner side surface 76 has a diameter which is at least as great as the diameter of the axially outer end portion 72 of the first inner side surface 66. The first inner side surface 66 slopes at an angle of about 5 to 15 degrees, and preferably about 8 degrees, to the central axis 68 of the vessel 14. The second inner side surface 76 slopes at an angle of about 20 to 60 degrees, and preferably about 30 degrees, to the central axis 68 of the vessel 14.

A cylindrical rim portion 84 (FIG. 2) extends axially outward from the second inner side surface 76. The rim portion 84 has a cylindrical inner side surface 86 encircling a central axis that is coincident with the central axis 68 of the vessel 14. The rim portion 84 also has a cylindrical outer side surface which forms part of a cylindrical outer side surface 88 of the neck portion 22. Although it is contemplated that the vessel 14 could be formed of many different materials, in the illustrated embodiment of the invention, the vessel 14 is formed as one piece of 6061-T6 aluminum.

A metal plug 18 is located in the circular opening 20 in the neck portion 22 of the vessel 14. The metal plug 18 (FIG. 2) has a smooth axially tapering outer side surface 90 disposed on an annular thick wall portion 24 of the plug. The outer side surface 90 of the plug tapers radially inward in a direction toward the chamber 16 in the vessel 14. The outer side surface 90 of the plug 18 is formed as a portion of a right circular cone and encircles a central axis which is coincident with a central axis 92 of the plug. When the plug 18 and vessel 14 are in the spatial relationship shown in FIG. 2, the central axis 92 of the plug is coincident with the central axis 68 of the vessel 14.

An axially outer end portion 96 of the outer side surface 90 on the plug 18 has a diameter which is slightly greater than the diameter of the inner end portion 70 of the first inner side surface 66 of the opening 24 in the vessel 14. The outer side surface 90 on the plug 18 is skewed at an angle of about 5 to 15 degrees, and preferably about 8 degrees, to the central axis 92 of the plug. Thus, the smooth axially tapering outer side surface 90 on the plug 18 slopes at the same angle as does the smooth axially tapering first inner side surface 66 of the opening 20 to the chamber 16 in the vessel 14.

The plug 18 has an annular flange 102 that projects radially outward from the thick wall portion 24 of the plug 18. The flange 102 includes a main radially extending section 104 and a generally cylindrical rib or wall portion 106 that projects axially from the radially outer periphery of the section 104. The rib 106 on the flange 102 has a central axis which is coincident with the central axis 92 of the plug 18. The rib 106 extends along an inner end portion 108 of the outer side surface 90. An annular groove 110 separates the rib 106 from the inner end portion 108 of the outer side surface 90.

The plug 18 has a cylindrical side wall 114 which is disposed in a coaxial relationship with the flange 102 and the central axis 92 of the plug 18 and projects axially away from the thick wall portion 24 of the plug. An actuator chamber 42 is partially defined by the cylindrical side wall 114. A thin wall portion 26 of the plug 18 extends radially across the central opening in the thick wall portion 26 of the plug. The thin wall portion 26 cooperates with the thick wall portion 24 and the cylindrical side wall 114 to form the actuator chamber 42.

A circular groove 118 is formed in the thin wall portion 26 of the plug 18 to weaken the thin wall portion 26. Although the plug 18 could be formed of many different metals, in the illustrated embodiment of the invention, the thick wall portion 24 and thin wall portion 26 are formed by a single piece of 6061-T6 aluminum.

A plurality of radially extending circular openings 122 (FIG. 2) are formed in the cylindrical side wall 114. The openings 122 enable fluid to flow from the actuator chamber 42 in the plug 18 into the canister 32 and air bag 36 (FIG. 1).

A fill passage 126 (FIG. 2) is formed in the cylindrical side wall 114 and the thick wall portion 24 of the plug 18. The fill passage 126 has a cylindrical main section 128 with a longitudinal central axis which extends parallel to the central axis 92 of the plug 18. In addition, the fill passage 126 has a valve chamber section 129 which is disposed in a coaxial relationship with the main section 128 and has a larger diameter than the main section.

The valve chamber section 129 of the fill passage 126 extends from a circular opening 130 in an annular end surface 132 of the plug 18 to the main section 128 of the fill passage. The main section 128 extends to a connector section 134 of the fill passage 126. The connector section 134 extends perpendicular to the main section 128 of the fill passage 126 and has a circular opening 136 in a cylindrical outer side surface 138 of the side wall 114.

A spherical ball valve 142 is disposed in the valve chamber section 129 of the fill passage 126. The ball valve 142 is movable between an open condition (FIG. 2) in which fluid can flow through the fill passage 126 and a closed condition (FIG. 3) blocking fluid flow through the fill passage. When the ball valve 142 is in the open condition illustrated in FIG. 2, the ball valve is spaced from an annular valve seat 144 and engages a metal blade 146 fixedly disposed in the valve chamber section 129 of the fill passage 126.

The blade 146 extends diametrically across the valve chamber section 129 of the fill passage 126 and has a thickness which is less than the radius of a cylindrical inner side surface of the valve chamber section 129 of the fill passage. The ball valve 142 has a diameter which is smaller than the diameter of the cylindrical inner side surface of the valve chamber section 129 of the fill passage 126. Therefore, when the ball valve 142 is in the open condition illustrated in FIG. 2, fluid can flow from the opening 136 through the fill passage 126 along a path which extends past the valve seat 144, around the ball valve 142 and past the blade 146.

When the plug 18 is connected with the vessel 14 and the vessel contains fluid under pressure in the chamber 16, the ball valve 142 is held in the closed condition of FIG. 3 by the fluid pressure in the chamber. When the ball valve 142 is in the closed condition, the ball valve engages the valve seat 144 and is spaced from the blade 146. When the ball valve 142 is in the closed condition, the ball valve blocks fluid flow past the valve seat 144 to seal the fill passage 126.

A seal plug (not shown) is placed across the opening 136 to the connector section 134 of the fill passage 126 to further seal the fill passage once the chamber 16 has been filled with fluid. The seal plug may be either a strip of metal welded across the opening 136 or a piece of metal inserted into the opening.

The fill plug 18 is connected with the vessel 14 to seal the opening 20 to the chamber 16 before the vessel is filled with fluid. The plug 18 is connected with the vessel 14 by an inertia welding operation. During the inertia welding operation, the plug 18 is gripped by a collet chuck. The collet chuck and a flywheel are accelerated to rotate the plug 18 about its central axis 92 at a relatively high speed.

When a predetermined rotational speed is reached, the driving force to the flywheel and collet chuck is interrupted. The rapidly rotating plug 18 is then inserted into the opening 20 in the vessel 14. As the rapidly rotating plug 18 is moved into the opening 20, the rib 106 on the flange 102 moves into engagement with the second inner side surface 76 of the neck portion 22 of the vessel 14. As the plug 18 is pressed against the vessel 14, the rib 106 is plastically deformed radially inward from the orientation shown in FIG. 2 to the orientation shown in FIG. 3.

As the rib 106 is deformed, heat due to friction is developed between the rib 106 on the rapidly rotating flange 102 and the second inner side surface 76 of the neck portion 22. The heat is effective to raise the temperature of the metal of the plug 18 and the metal of the vessel 14 to a temperature which approaches but is below the melting temperature of the metal. As this occurs, a fluid tight annular weld 160 (FIG. 3) is formed between the rib 106 on the flange 102 and the second inner side surface 76 of the vessel 14. The annular weld 160 extends completely around the plug 18 and securely welds the plug to the vessel 14.

As the rib 106 on the flange 102 is pressed against the second inner side surface 76 of the vessel 14, the smooth axially tapering outer side surface 90 on the plug 18 is pressed against the smooth axially tapering first inner side surface 66 of the vessel 14. The rapidly rotating outer side surface 90 of the plug 18 is pressed against the stationary first inner side surface 66 of the vessel 14 and establishes a fluid tight seal with the first inner side surface of the vessel 14. There may be some localized welding of the outer side surface 90 of the plug 18 to the first inner side surface 66 of the vessel 14. The majority of the outer side surface 90 on the plug 18, however, is pressed against the first inner side surface 66 of the vessel 14 with sufficient force to establish a fluid tight seal between the axially tapering surfaces without welding of the surfaces to each other.

Once the plug 18 has been welded to the vessel 14 at the weld 160 (FIG. 3), the rim portion 84 on the neck portion 22 of the vessel 14 is plastically deformed radially inward and pressed firmly against the main section 104 of the flange 102 (FIG. 4). The rim portion 84 of the vessel 14 is deformed by a crimping or swaging operation. The rim portion 84 of the vessel 14 overlies the flange 102 and presses the flange toward the second inner side surface 76 of the vessel 14 to assist in holding the plug 18 in the opening 20.

Although the seal between the rim portion 84 of the vessel 14 and the flange 102 on the plug 18 may not be truly fluid tight, the weld 160 between the flange and the second inner side surface 76 of the vessel 14 is fluid tight. In addition, a fluid tight seal is formed between the smooth axially tapering outer side surface 90 of the plug 18 and the smooth axially tapering first inner side surface 66 of the vessel 14. Thus, a pair of fluid tight seals are formed between the plug 18 and the vessel 14. The pressing of the rim portion 84 of the vessel against the flange 102 on the plug 18 provides a redundant retention feature to make certain that the fluid tight seals between the plug 18 and the vessel 14 are maintained.

Once the plug 18 has been connected to the vessel 14, the chamber 16 in the vessel is filled with fluid under pressure. To fill the chamber 16 with fluid under pressure, a source of pressurized fluid is connected with the opening 136 to the fill passage 126. The pressurized fluid presses the ball valve 142 against the blade 146. The pressurized fluid flows through the open valve seat 144 into the chamber 16.

After the chamber 16 has been filled with pressurized fluid, the source of pressurized fluid is disconnected from the opening 136 to the fill passage 126. The pressure of the fluid in the chamber 16 causes the ball valve 142 to move upward (as viewed in FIG. 3) into sealing engagement with the valve seat 144 to seal the fill passage 126. The opening 136 to the fill passage 126 is then sealed by welding or otherwise connecting a seal plug across or in the opening. After the chamber 16 has been filled and the fill passage 136 sealed by both the ball valve 142 and a seal plug at the opening 136, an actuator assembly 40 (FIG. 1) is installed in the actuator chamber 42.

The actuator assembly 40 is connected with a deceleration sensor (not shown) by electrical conductors 44 and 46. The actuator assembly 40 includes a generally cylindrical housing 50 which is connected to the plug 18 and encloses a squib 52. When the deceleration sensor detects the occurrence of sudden vehicle deceleration of a magnitude above a predetermined threshold, ignitable material in the squib 52 is ignited by electrical energy conducted through the electrical conductors 44 and 46. Combustion products from the squib 52 expel a movable carrier 56 from the housing 50. As this occurs, ignitable material 58 in the movable carrier 56 is ignited.

The thin wall portion 26 of the plug 18 is pierced by the movable carrier 56. Immediately thereafter, the movable carrier 56 moves into the chamber 16 in the vessel 14. The burning material 58 in the carrier 56 ignites the combustible mixture of gases. The pressure in the chamber 16 increases and causes the thin wall portion 26 of the plug 18 to rupture at the groove 118. Heated gases flow from the chamber 16 through the ruptured thin wall portion 26 of the plug 18, through chamber 42 of the plug, and through the circular openings 122 in the plug into the canister 32 and the air bag 36. The gases inflate the air bag 36 to help restrain movement of an occupant of a vehicle and thereby help protect the vehicle occupant during sudden vehicle deceleration requiring air bag deployment.

From the above description of the invention, those skilled in the art will perceive improvements, changes and modifications. For example, the actuator assembly 40 could be of a variety of constructions different than the illustrated actuator assembly. Such improvements, changes and modifications within the skill of the art are intended to be covered by the appended claims.

Having described the invention, the following is claimed:

1. An inflator for inflating an inflatable vehicle occupant protection device, said inflator comprising:

a vessel having a chamber for holding fluid under pressure to inflate the inflatable device, said vessel having inner surface means for at least partially defining an opening to the chamber;

a plug disposed in the opening in said vessel to block the opening, said plug having passage means for directing fluid from said chamber to the inflatable device; and a weld between said inner surface means on said vessel and said plug to retain said plug in said vessel and to form a fluid tight seal between said vessel and said plug;

said vessel having a rim which is disposed outward of said weld and extends over a portion of said plug to further retain said plug in said vessel.

2. An inflator as set forth in claim 1 wherein said inner surface means includes an inner surface which tapers radially inward in a direction away from said weld and toward the chamber in said vessel, said plug having an outer surface which tapers radially inward in a direction away from said weld and toward the chamber in said vessel, said outer surface on said plug being in sealing engagement with said inner surface on said vessel.

3. An inflator as set forth in claim 1 wherein said plug has a passage which extends between the chamber in said vessel and the environment around said vessel, and a valve member disposed in said passage, said valve member being movable between an open condition enabling fluid under pressure to flow through said passage into the chamber in said vessel and a closed condition blocking fluid flow through said passage, said valve member being movable from the open condition to the closed condition under the influence of fluid pressure in the chamber.

4. An inflator as set forth in claim 1 wherein said plug includes a body portion and an annular flange which projects radially outward from said body portion, said inner surface means including an inner surface which is disposed on said vessel and tapers radially inward in a direction toward the chamber in said vessel, said weld being formed between said inner surface which is disposed on said vessel and said annular flange on said body portion of said plug.

5. An inflator as set forth in claim 4 wherein said rim of said vessel is disposed in engagement with an axially outer side surface of said flange on said plug.

6. An inflator as set forth in claim 1 wherein said plug includes a thin wall portion which is rupturable to form an opening to enable fluid to flow from the chamber in said vessel to the air bag to inflate the inflatable device and a thick wall portion which extends around said thin wall portion.

7. An inflator as set forth in claim 6 wherein said plug includes a flange which extends around said thick wall portion of said plug, said weld being disposed between said flange and said inner surface means on said vessel, said rim being disposed in engagement with an outer side of said flange.

8. An inflator for inflating an inflatable vehicle occupant protection device, said inflator comprising:

a vessel having a chamber for holding fluid under pressure to inflate the inflatable device, said vessel having an inner side surface which tapers radially inward in a direction toward the chamber in the vessel and at least partially defines an opening to the chamber;

a plug disposed in the opening to the chamber to block the opening, said plug having passage means for directing fluid from said chamber to the inflatable device, said plug further having an outer side surface which tapers radially inward in a direction toward the chamber in the vessel, said outer side surface on said plug engaging said inner side surface on said vessel to at least partially seal the opening to the chamber; and a weld interconnecting said plug and said vessel to further seal the opening to the chamber.

9. An inflator as set forth in claim 8 wherein said outer side surface on said plug is disposed between said weld and the chamber to enable engagement of said outer side surface on said plug with said inner side surface on said vessel to at least partially block leakage of fluid to said weld.

10. An inflator as set forth in claim 8 wherein said plug includes a thin wall portion which is rupturable to enable fluid to flow from the chamber in said vessel to inflate the inflatable device, said plug having a thick wall portion which extends around said thin wall portion, said outer side surface of said plug being disposed on said thick wall portion of said plug.

11. An inflator as set forth in claim 8 wherein said plug has a passage which extends between the chamber in said vessel and the environment around said vessel to enable a flow of fluid to be conducted into the chamber in said vessel through said passage.

12. An inflator as set forth in claim 8 wherein said vessel has a second inner side surface which tapers radially inward in a direction toward the chamber in said vessel, said plug having an annular flange which is disposed in engagement with said second inner side surface on said vessel, said weld being formed between said flange on said plug and said second inner side surface on said vessel.

13. An inflator as set forth in claim 12 wherein said vessel further includes a rim which overlies said flange on said plug to retain said plug in said vessel.

14. An inflator for inflating an inflatable vehicle occupant protection device, said inflator comprising:

a vessel having a chamber for holding fluid under pressure to inflate the inflatable device, said vessel having a first inner side surface which tapers radially inward in a direction toward the chamber in said vessel and a second inner side surface which tapers radially inward in a direction toward the chamber in said vessel, said first and second inner side surfaces at least partially defining an opening to the chamber; and a plug disposed in the opening to the chamber to block the opening, said plug having passage means for directing fluid from said chamber to the inflatable device, said plug further having a first outer side surface which tapers radially inward in a direction toward the chamber, said first outer side surface on said plug engaging said first inner side surface on said vessel to at least partially seal the opening to the chamber, said plug having a second outer side surface which engages said second inner side surface on said vessel to further seal the opening to the chamber.

15. An inflator as set forth in claim 14 further including a weld formed between said second outer side surface on said plug and said second inner side surface on said vessel to further seal the opening to the chamber.

16. An inflator as set forth in claim 15 wherein said first outer side surface on said plug tapers from a large end portion to a small end portion, said second outer side surface on said plug being disposed on an annular flange which projects radially outward of said large end portion of said first outer side surface on said plug, said flange having a rim portion which is deflected by engagement with said second inner side surface on said vessel, said weld being at least partially formed between said rim portion of said flange and said second tapering inner side surface on said vessel.

17. An inflator as set forth in claim 14 wherein said first inner side surface on said vessel is disposed between said second inner side surface on said vessel and said chamber, said first inner side surface on said vessel tapering radially inward from a large end portion toward the chamber, said second inner side surface on said vessel tapering from a large end portion to a small end portion adjacent to the large end portion of the first inner side surface, said small end portion of said second inner side surface being at least as large as said large end portion of said first inner side surface.

18. An inflator as set forth in claim 14 wherein said plug includes a thin wall portion which is rupturable to enable fluid to flow from the chamber in said vessel to inflate the air bag, said plug having a thick wall portion which extends around said thin wall portion, said first outer side surface on said plug being disposed on said thick wall portion of said plug.

19. An inflator as set forth in claim 14 wherein said plug has a passage which extends between the chamber in said vessel and the environment around said vessel to enable a flow of fluid to be conducted into the chamber in said vessel through said passage.

20. An inflator as set forth in claim 19 further including a valve member disposed in said passage in said plug, said valve member being movable relative to said passage in said plug between an open condition enabling fluid under pressure to flow through said passage into the chamber in said vessel and a closed condition blocking fluid flow through said passage, said valve member being movable from the open condition to the closed condition under the influence of fluid pressure in the chamber in said vessel.

* * * * *